Feb. 18, 1969  J. DEMEUR  3,428,822
CIRCUIT CAPABLE OF PRODUCING A CONDITION OF INCOMPATIBILITY
BETWEEN TWO OR SEVERAL LOGIC VARIABLES
Filed Jan. 25, 1966
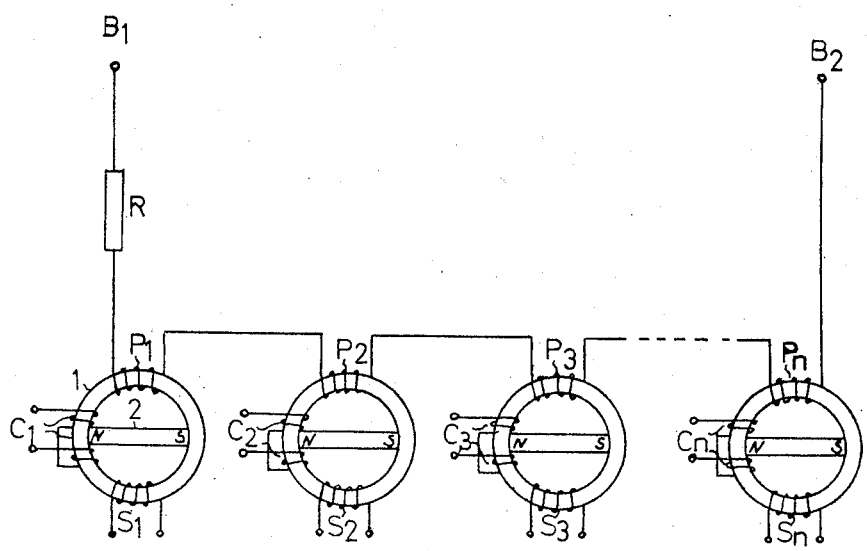
INVENTOR
Jean DEMEUR
BY
ATTORNEYS

United States Patent Office 3,428,822
Patented Feb. 18, 1969

3,428,822
CIRCUIT CAPABLE OF PRODUCING A CONDITION OF INCOMPATIBILITY BETWEEN TWO OR SEVERAL LOGIC VARIABLES
Jean Demeur, Leeuw-St.-Pierre, Belgium, assignor to Ateliers de Constructions Electriques de Charleroi (ACEC), Charleroi, Belgium
Filed Jan. 25, 1966, Ser. No. 522,938
Claims priority, application Belgium, Jan. 28, 1965, 8,273, Patent 658,930
U.S. Cl. 307—88       1 Claim
Int. Cl. H01f 29/14; H03k 17/82

The instant invention relates to logic control circuits of all types, namely those used in the automatic control of railway signalling devices.

An object of the circuit according to the present invention is to prevent the appearance of a determining variable in a logic circuit when it is accompanied by one or several other variables that are incompatible with it. It comprises two or several elements having, on a magnetic circuit presaturated by a permanent magnet, a primary winding, a secondary winding and a desaturation D.C. winding which, when excited, will cause induction by the primary winding of a secondary voltage, the excitation currents of these desaturation windings representing different variables, and it is characterized in that the primary windings of these elements are connected in series through a resistance by an alternating voltage, this resistance and the impedances of the primary windings of the elements being so proportioned that when the desaturation windings of at least two elements are energized, the secondary voltages of the latter are sufficiently weak to have no action on the logic circuits to which they are applied.

The following description refers to the single appended drawing which is an electrical diagram relating to a particular embodiment of the invention.

The figure illustrates a series of magnetic elements each comprising a magnetic circuit 1 in the shape of a torus that is presaturated by a permanent magnet incorporated in a diametral magnetic bridge 2, carrying primary windings $P_1$, $P_2$ ... $P_n$, secondary windings $S_1$, $S_2$ ... $S_n$ and control windings $C_1$, $C_2$ ... $C_n$. To the latter are applied currents representing different variables acting in an assembly of logic circuits (not shown) but each of these variables may only act separately.

The windings $P_1$, $P_2$ ... $P_n$ are connected in series and supplied with alternating voltage of appropriate size and frequency through a resistance R from terminals $B_1$ and $B_2$.

When no current flows in the control windings $C_1$, $C_2$ ... $C_n$, the magnetic circuits of the corresponding elements are all saturated which means that the impedances of the primary windings $P_1$, $P_2$ ... $P_n$ are very weak and all of the supply voltage is practically applied across the resistance R. The voltages across the secondaries $S_1$, $S_2$ ... $S_n$ are nil.

If a direct current flows in one of the control windings such as $C_1$, the magnetic circuit of the corresponding element becomes desaturated and a voltage appears across secondary $S_1$ that is sufficient to affect the associated logic circuit. But if, simultaneously, another control winding such as $C_3$ is energized, the supply voltage is distributed between the resistance R and the primary windings $P_1$ and $P_3$ in relation to their relative impedances and the latter are such that the voltages appearing across secondaries $S_1$ and $S_3$ are too weak to affect the next logic circuits. The same thing happens, the more so, if more than two control windings are energized. Each of the variables is active only if it is the only one present. The above described circuit may be associated with all known logic circuits and used for all applications; variations may be made thereto without departing from the spirit of the present invention.

I claim:
1. A circuit capable of providing incompatibility between two or more logic variables comprising:
 (a) at least two elements, each having:
  a magnetic circuit;
  a permanent magnet presaturating said circuit;
  a primary A.C. winding and a secondary winding wound around said magnetic circuit, and
  a D.C. desaturation winding so arranged that, when excited, allows the induction of a secondary voltage by the primary winding; the exciting direct currents of the said desaturation windings representing said logic variables;
 (b) a resistance and an A.C. source;
 (c) the primary windings of said elements being connected in series through said resistance to said A.C. source;
 (d) said resistance and the impedances of said element primary winding being so proportioned that when the desaturation windings of at least two of said elements are energized, the secondary voltages induced in the corresponding secondary winding are sufficiently weak to affect the logic circuits to which they are applied.

References Cited

UNITED STATES PATENTS
3,233,112   2/1966   Baldwin _____ 307—88

BERNARD KONICK, *Primary Examiner.*
B. L. HALEY, *Assistant Examiner.*

U.S. Cl. X.R.
340—174